United States Patent [19]

Dye et al.

[11] Patent Number: 4,658,245
[45] Date of Patent: Apr. 14, 1987

[54] TOOL CONDITION AND FAILURE MONITORING APPARATUS AND METHOD

[75] Inventors: Denver R. Dye, Hiram; David J. Gee, Twinsburg; Richard L. Patterson, South Euclid; Stephen M. Zielaskiewicz, Garfield Hts., all of Ohio

[73] Assignee: The Warner & Swasey Company, Cleveland, Ohio

[21] Appl. No.: 490,010

[22] Filed: Apr. 29, 1983

[51] Int. Cl.$^4$ ............................................. G08B 21/05
[52] U.S. Cl. ...................................... 340/683; 51/2 C
[58] Field of Search .................. 340/683, 680; 51/2 C

[56] References Cited

U.S. PATENT DOCUMENTS

| | | | |
|---|---|---|---|
| 3,201,776 | 8/1965 | Morrow et al. | 340/683 |
| 3,979,739 | 9/1976 | Birchall | 340/683 |
| 4,087,801 | 5/1978 | Noh | 340/680 |
| 4,207,567 | 6/1980 | Juengel et al. | 340/680 |
| 4,296,364 | 10/1981 | Fukuyama et al. | 318/572 |
| 4,441,103 | 4/1984 | Urabe | 340/683 |
| 4,514,797 | 4/1985 | Begin | 340/683 |

OTHER PUBLICATIONS

Kannatey-Asibu, Jr. et al., "Quantitative Relationships for Acoustic Emission from Orthogonal Metal Cutting", *Trans. of the Asme* vol. 103, pp. 330-340.
Dornfeld, "Tool Wear Sensing Via Acoustic Emission Analysis," *Proceedings of* 8th *North Am. Manufacturing Research Conf.*, pp. A1-A8.
Brindley, et al., "The Use of Ring-Dorn Counting," *Non-Destructive Testing*, Dec., 1973, pp. 299-306.
Moriwaki et al., "Detection for Cutting Tool Fracture by Acoustic Emission Meas.," *Annals of the CIRP*, vol. 29, No. 1, 1950, pp. 35-40.

*Primary Examiner*—Glen R. Swann, III
*Attorney, Agent, or Firm*—K. A. Seaman; T. K. Zeigler; R. J. Eifler

[57] ABSTRACT

An apparatus and method for tool condition and failure monitoring system for predicting imminent tool failure by sensing acoustic emissions from a cutting operation converting the emissions into an electrical signal filtering the electrical signal and using a "count rate" technique on the filtered signal to generate a signal indicative of imminent failure. To improve the prediction, the filtering includes removal of low frequency and d.c. signals and the imminent failure is indicated only after several successive periods of a triggering level of count rate.

2 Claims, 15 Drawing Figures

TOOL CONDITION AND FAILURE MONITORING APPARATUS AND METHOD

BACKGROUND OF THE INVENTION

1. Technical Field

The present invention relates to improvements in a tool condition and failure monitoring apparatus and method. More particularly, the present invention relates to an apparatus for monitoring tool condition by acoustic emission analysis and predicting of imminent tool failure prior to failure in cutting tool applications such as turning machines and other cutting tool applications.

2. Background Art

Cutting tools for turning machines are generally made of tool steel or carbides (with or without a coating) and have a finite life before failure, frequently by breaking. Avoiding such failure is desirable to protect the workpiece being machined and the machine itself from damage which can be caused by the workpiece. A workpiece being machined with a broken tool can be torn from the chuck jaws and do substantial damage to the machine.

One approach that has been suggested is that each tool be used for a predetermined period, either in time or number of workpieces, then changed automatically without regard to appearance, quality of workpiece, or other factors.

In U.S. Pat. No. 4,296,364 tools are adjusted based upon the frequency or time of use of the machine. When the tools can no longer be adjusted in such a system, they are changed, a crude system of tool wear monitoring without respect to condition.

Unfortunately, due to differences in the cutting tool microstructure and the methods used in the manufacture of such cutting tools, cutting tool life varies significantly from one cutting tool to the next, even in the same manufacturing batch. Other than for gross deficiencies (such as improper shape or lack of colored coating), it is difficult, if not impossible, to predict cutting tool life during manufacture or inspection.

In some manufacturing environments, the turning machine opertor personally determines when a cutting tool has reached the end of its useful life. This is accomplished through either visual means (watching for telltale signs from the cutting operation, such as sparks, or from the surface, such as deteriorating surface finish) or audible means (listening for "groans" from the machine.) This approach to sensing tool wear or failure requires an experienced operator for the turning machine, making it labor intensive, and reliant upon learned skills which may vary from one operator to the next. Since relatively long periods may pass without tool failure, the operator may not be attentive to changed conditions and miss recognizing the failure in time. Today's manufacturing techniques emphasize reducing the number of manufacturing workers and the special skills required of them, making operator determination of tool failure undesirable, as well as unnecessarily expensive.

Other systems rely on monitoring power required for a cutting operation, perhaps in comparison with historical power level requirements. One such system is disclosed in U.S. Pat. No. 4,207,567. The theory is that, when the tool fails or is about to fail, significant power deviations, either increases or decreases, are indicative of tool failure. Experience indicates that such methods are only partially successful in accurately predicting tool failure in a timely fashion.

The prior art has suggested that cutting-tool life or imminent failure can be predicted by the use of acoustic emissions detecting a characteristic voltage level (or threshold) signal which is emitted prior to failure. This threshold detection system is unreliable in that some tool failures are not predicted, and for other tools, failures are prematurely predicted.

This threshold detecting system also fails to account for a "shoulder effect" where machining near a workpiece shoulder causes high acoustic emissions as a result of the shoulder, not as a result of imminent tool failure. A threshold detection system frequently falsely triggers due to incorrectly interpreting a shoulder effect.

Various articles have been presented regarding tool wear sensing through the use of acoustic emission analysis. An article "Tool Wear Sensing Via Acoustic Emission Analysis" in *Proceedings of the 8th North American Manufacturing Research Conference* by David A. Dornfeld teaches that RMS monitoring of a continuous acoustic emission is preferred over other techniques such as count or count rate for such tool wear monitoring.

An article entitled "Quantitative Relationships for Acoustic Emission From Orthogonal Metal Cutting", authored by Kannatey-Asibu and Dornfeld in the *Transactions of the ACME,* August 1981 at page 330, discloses various techniques for processing acoustic emission signals.

An article "Acoustic Emission-3, The Use of Ringdown Counting" by Brindley, Holt and Palmer from *Non Destructive Testing,* Page 299, January 1974, describes another system for employing an acoustic emission signal using cumulative or total count or acoustic emissions as an indication of failure.

An article entitled "Detection for Cutting Tool Fracture by Acoustic Emission Measurement" by Moriwaki from *ANNALS OF THE CIRP,* Vol. 29, No. 1, 1980, pp. 35–40 suggests that an absolute or cumulative count of pulses exceeding the predetermined threshold be used for predicting tool failure.

Although there are several methods suggested in the prior art for predicting tool wear failure, none are entirely satisfactory in terms of accurately predicting imminent tool failure at the end of a cutting tool's life.

SUMMARY OF THE INVENTION

The present invention overcomes the limitations and disadvantages of the prior art systems by providing a system for monitoring tool condition and breakage by processing acoustic emission signals. The system includes an electric signal from an acoustic emission transducer, the voltage of which varies based upon the acoustic emissions of the cutting tool and the cutting process. The electric signal is amplified and filtered (thereby removing d.c. and low frequency signals), then passed through a threshold detector. The output signal from the threshold detector is then applied to a count rate system by which imminent tool failure is predicted when the count rate (or counts in a predetermined time interval) exceeds a predetermined level. Advantageously, the count rate "trigger" must remain above the predetermined level for several intervals to avoid false triggers based upon transient effects such as a "shoulder effect".

The method and apparatus of the present invention dispense with a turning machine operator trained to identify tool condition, wear or imminent failure of the cutting tool. As a result, such a tool condition sensing apparatus and method are essential elements of an unmanned machine tool when coupled with, for example, an automatic tool changer and robotic workpiece loading. Further, an unmanned machine tool can be integrated into an automated, yet flexible, system or factory through appropriate computers and software.

The present invention overcomes the false triggers of the simple threshold acoustic emission signal systems by discriminating between the real tool failure signals and imitation noise signals from other sources.

This method and apparatus have the advantage that the unique microstructure aspects of each cutting tool can be considered and compensated for and that a substantially greater portion of the tool life can be used without a high probability of tool failure.

Other objects and advantages of the present invention will be apparent to those skilled in the art of cutting tool wear analysis, in view of the following detailed description of the preferred embodiment, the appended claims and the accompanying drawings.

BEST MODE FOR CARRYING OUT THE INVENTION

Figure 1:
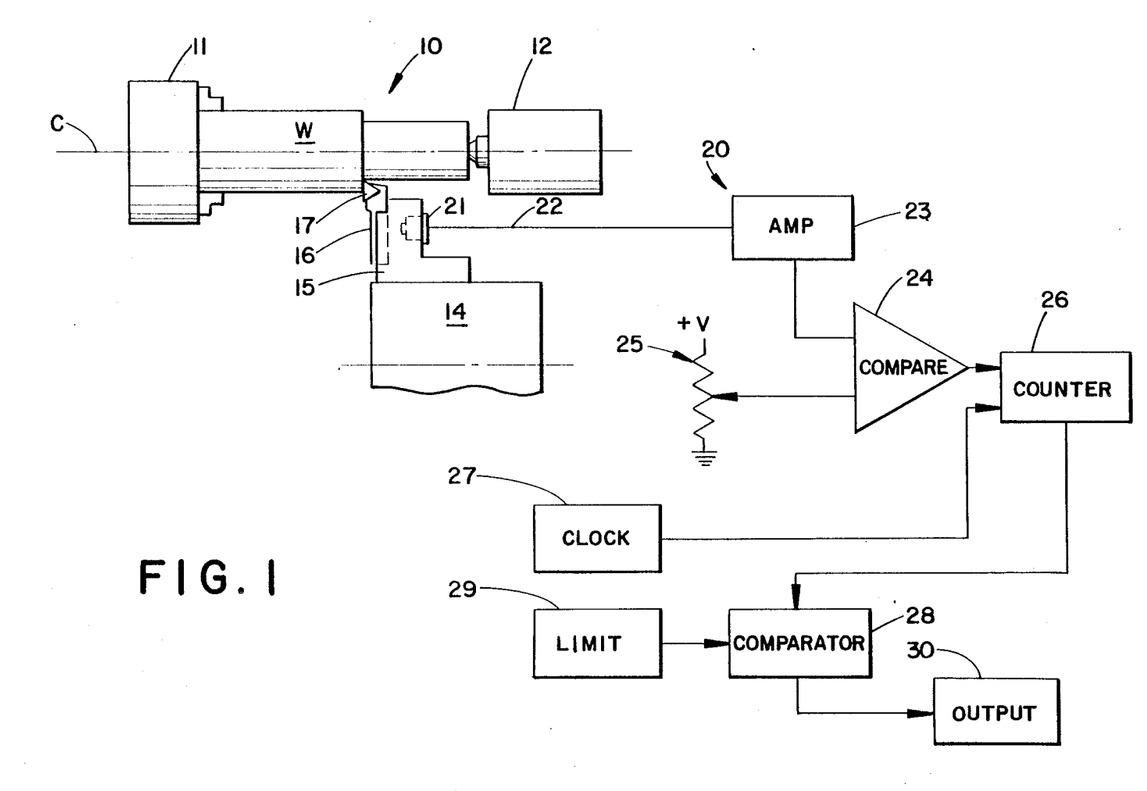
FIG. 1 is a block diagram of one embodiment of the tool condition and breakage monitoring system of the present invention.

FIG. 1 illustrates, in block diagram form, a machine tool 10 and acoustic tool condition monitoring system 20 according to the present invention. The machine tool 10 is advantageously a lathe or turning machine, for example, of the type sold by The Warner & Swasey Company as a Model WSC-12. The machine tool 10 as shown includes a chuck 11, a tailstock 12, and a movable turret 14. A workpiece W is held between the chuck 11 and the tailstock 12 and driven in rotation around a center line C. The turret 14 has a tool block 15 carrying a tool holder 16. A cutting tool 17 is mounted in the tool holder 16.

The tool wear monitoring system 20 includes an acoustic emission transducer 21 carried on the tool block 15 for sensing the acoustic emission from the cutting of the workpiece W by the cutting tool 17. The acoustic transducer 21 produces a time-varying electrical signal on line 22, which is amplified by an amplifier 23 and fed into a comparator 24, which produces a single count pulse when the signal exceeds a level set by a variable resistor 25. A counter 26 responds to output pulses from the comparator 24 and a timer (or clock) 27 which periodically resets the counter 26. A comparator 28, coupled to the counter 26 and a preset limit or level 29 provides an output signal 30 whenever the counter 26 exceeds the preset limit 29, and dwells or remains above the preset limit for a pre-determined amount of time in an optional arrangement to deal with transient effects to be described later. This output signal is indicative of failure, imminent failure or unacceptable wear of the tool 17 and that machining of the workpiece W with the particular tool 17 should be terminated.

Examples of parameters which seemed to work in experimental settings included:

Example 1:

A workpiece of C1045 steel material was driven at 1100 surface feet per minute and a cutting tool made of Kennametal grade KC 850 carbide having a Titanium Nitride coating was used to remove stock at 0.020 inches per revolution and 0100 inches depth of cut. A Bruel & Kjaer Type 8312 transducer and a Bruel & Kjaer Wideband Amplifier Type 2768 with a high pass filter (set at 50 KHz) were used, and a threshold of 0.6 volts at the variable input 25 was used. A limit of 10,200 pulses over the threshold in 100 milliseconds was used.

Example 2:

A workpiece of C1045 steel material was driven at 1000 surface feet minute and a cutting tool made of Kennametal grade KC 810 carbide having a Titanium Nitride coating was used to remove stock at 0.020 inches per revolution and 0.050 inches depth of cut. A Bruel & Kjaer Type 8312 transducer and a Bruel & Kjaer Wideband Amplifier Type 2768 with a high pass filter (set at 50 KHz) were used, and a threshold of 0.6 volts at the variable input 25 was used. A limit of 10,000 pulses over the threshold in 100 milliseconds was used.

Example 3:

A workpiece of C1141 steel material was driven at 1200 surface feet per minute and a cutting tool made of Kennametal grade KC 850 carbide having a Titanium Nitride coating was used to remove stock at 0.015 inches per revolution and 0.100 inches depth of cut. A Bruel & Kjaer Type 8312 transducer and a Bruel & Kjaer Wideband Amplifier Type 2768 with a high pass filter (set at 50 KHz) were used, and a threshold of 0.4 volts at the variable input 25 was used. A limit of 15,300 pulses over the threshold in 100 milliseconds was used.

Example 4:

A workpiece of C1045 steel material was driven at 800 surface feet per minute and a cutting tool made of Kennametal grade K 21 carbide having no coating was used to remove stock at 0.020 inches per revolution and 0.100 inches depth of cut. A Bruel & Kjaer Type 8312 transducer and a Bruel & Kjaer Wideband Amplifier Type 2768 with a high pass filter (set at 50 KHz) were used, and a threshold of 0.6 volts at the variable input 25 was used. A limit of 10,000 pulses over the threshold in 100 milliseconds was used.

In each instance the system predicted with reasonable success the imminent failure of the tool 17 by breakage, which was confirmed in some instances by allowing the tool to break by continuing machining, rather than by stopping the machining or changing the tool. In preferred embodiments, the machining will be terminated when imminent failure exists.

FIG. 1's description, as well as that associated with later figures, applies most directly to a digital system for acoustic emission processing, but the present invention may be implemented in an equivalent system. The tool wear monitoring system 20 of FIG. 1 may include the acoustic emission transducer 21 and a single channel pulse height analyzer of the type sold by Harshaw Corporation and used in the nuclear field, except with a high frequency pass band filter added to its input. In such a system, the counter 26 is replaced by a capacitor which integrates the pulses above the threshold into a voltage level, and the function of the comparator 28 and the preset limit 29 is accomplished by an analog high level trip. The Clock 27 is accomplished by an RC time constant. Either an analog or a digital system operates substantially similar in analyzing emission signals.

Figure 2A:
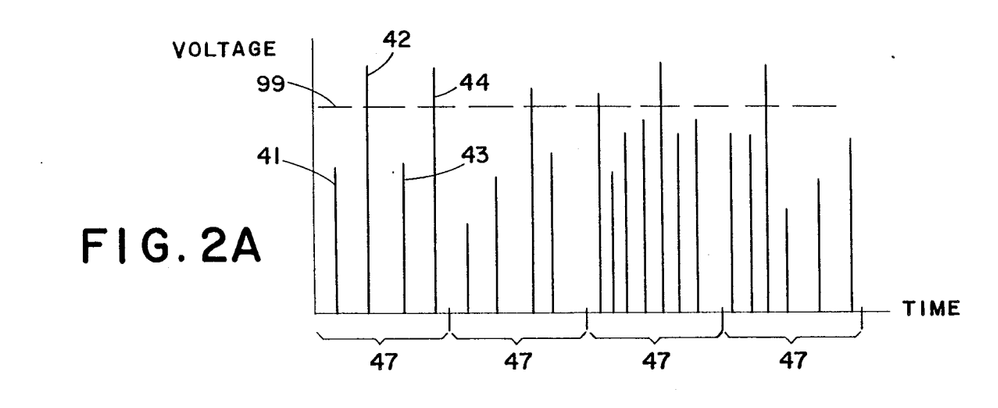
FIGS. 2A and 2B are examples of electrical signals within the system of FIG. 1.

In FIG. 2A some representative discrete output signals 41,42,43,44 from the amplifier 23 (of FIG. 1) are shown with their voltage plotted against time. A threshold voltage 99 is shown, as might be selected, with the signals 41,43 being below the threshold 99 and the signals 42,44 exceeding the threshold 99. A timer interval 47 is depicted, which may be successive 100 millisecond periods. These 100 millisecond periods are output by the clock 27 and form fixed time sample windows during which pulses from the comparator 24 are counted by the counter 26.

Figure 2B:
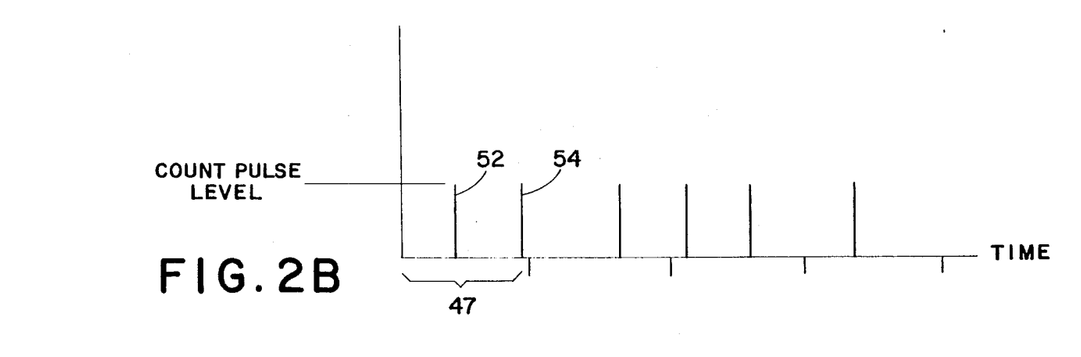

In FIG. 2B, count signals 52,54 from the comparator 24 (of FIG. 1) are shown, representing, respectively, the signals 42, 44 which exceeded the threshold 99 in FIG. 2A. The time interval 47 is as shown in FIG. 2A, and results from the clock 27.

Figure 3:
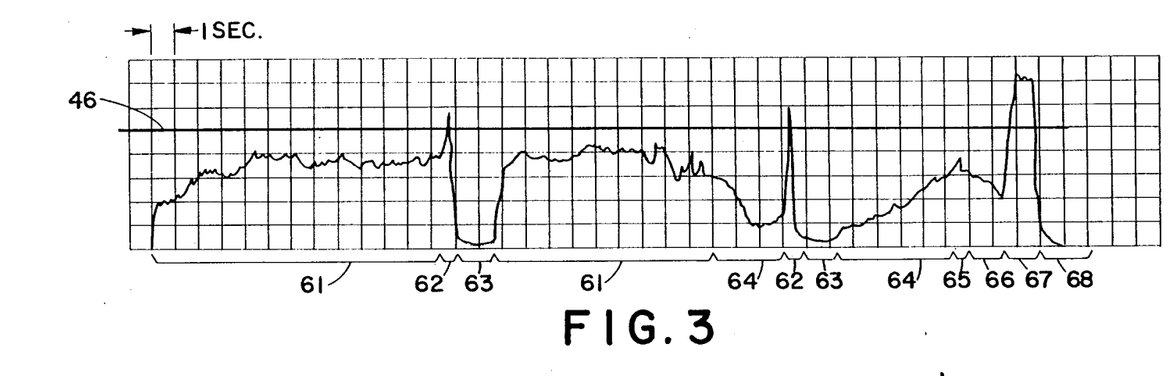
FIGS. 3-5 are illustrative plots for various cutting operations of counts of filtered acoustic emissions passed through a threshold detector versus time.

In FIG. 3, a typical plot of count rate versus time is shown, in which periods of normal cutting (61), shoulder effect (62), no cutting (63), cratering (64), crater-break through (65), post crater-breakthrough (66) and prefailure (67) are shown. A dwell above the threshold 46 for the interval is required to establish the prefailure signal, to discriminate from the shoulder effect signals 62 which exceed the threshold 46 but do not imply the end of the useful life of the tool.

One important, but optional feature of this system is the presence of a "shoulder effect". That is, when the cutting tool 17 approaches a shoulder on workpiece W (at the chuck end, for example), a pronounced transient (short term) peak in a shoulder effect 62 can be seen in FIG. 3. Since this peak frequently exceeds the threshold 46 without necessarily indicating any tool failure tendency it must not be interpreted to signify a tool failure. The shoulder effect causes varying amounts of acoustic emission activity (depending on condition), but always of very short duration. An established 800 msec period has been selected as the time for which the signal must exceed the trip level before it is considered a true indication of imminent tool failure. If the signal returns below the threshold 46 before the 800 msec has expired, it is interpreted as a transient or false alarm, and ignored.

Figure 4:
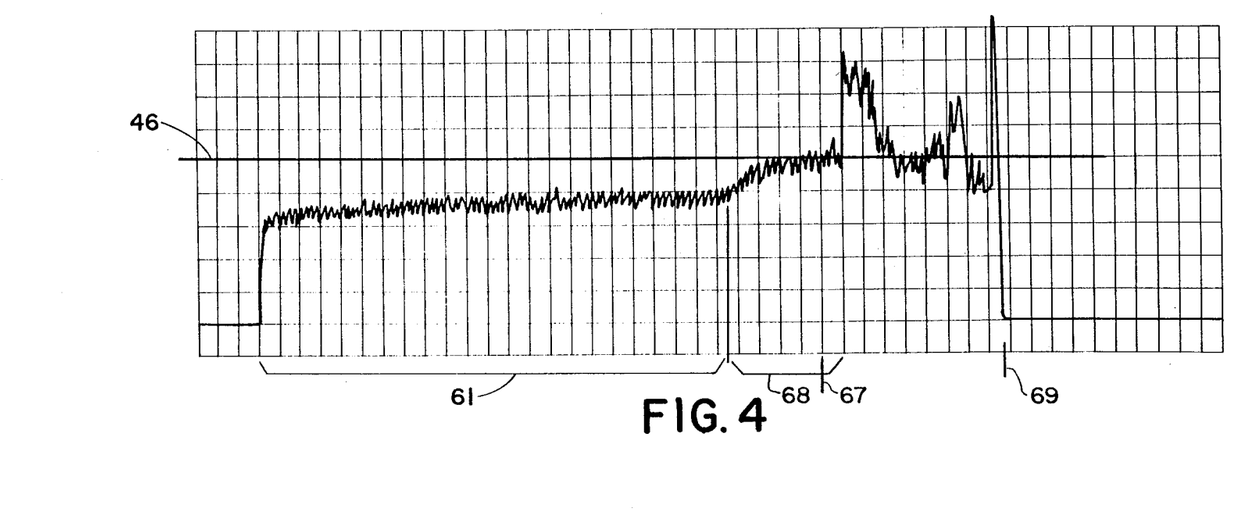

FIG. 4 shows a plot of count level against time for a Kennametal KC 850 carbide insert with a Titanium Nitride coating machining on a steel workpiece. A threshold 46 of 6000 counts in the 100 msec period was used as a failure indicating level. Regions of normal cutting (61), coating failure (68) and nose failure (69), as well as a failure detection (67), are shown.

Figure 5:
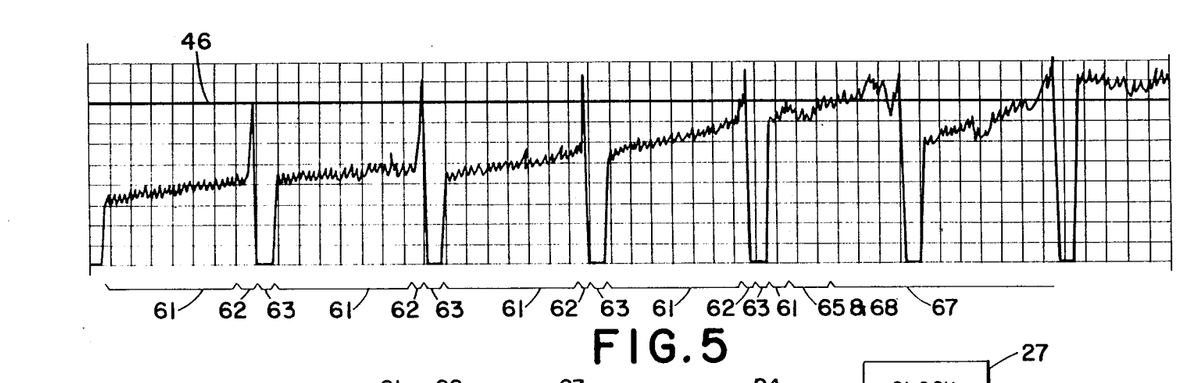

FIG. 5 shows another representative plot of acoustic emissions from a coated cutting tool operation. Regions of normal cutting (61), shoulder effect (62), no cutting (63), crater breakthrough (65), together with coating failure (68), as well as failure detection (67) are shown.

As a result of tool analysis and plotting of acoustic emission count rate against time, signature signals have been matched or correlated, with physical phenomenon. For example, the failure of a coating on a coated cutting tool has been associated with a small amplitude step up in the count rate, followed by a gradual rise in the count rate over a longer time. Crater breakthrough has been characterized by a small peak in the count rate, followed by a slow rate of decline in count rate.

Figure 6:
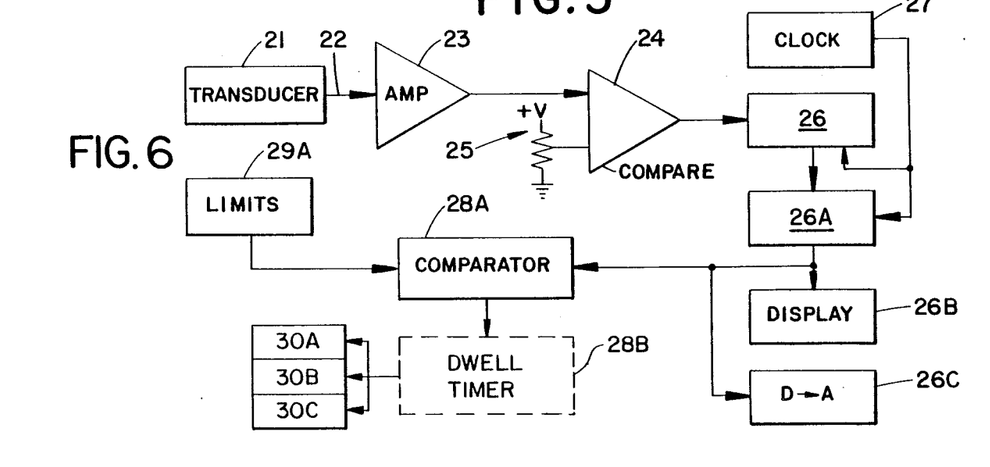
FIG. 6 is a block diagram of an alternate embodiment of an electronic digital system for processing acoustic emissions from the machine tool of FIG. 1.
Figure 7A:
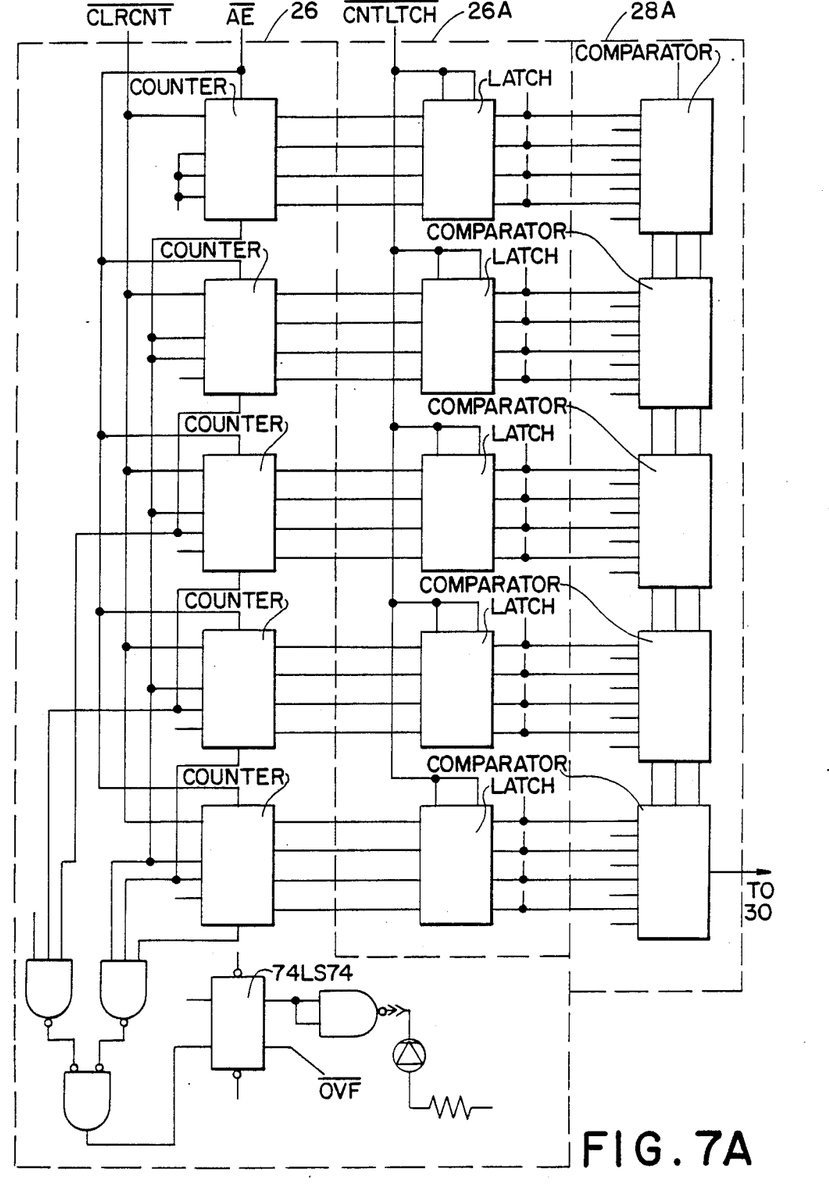
FIGS. 7a-7e, 8 and 9 are electric detailed schematics for the FIG. 6 embodiment.
Figure 7B:
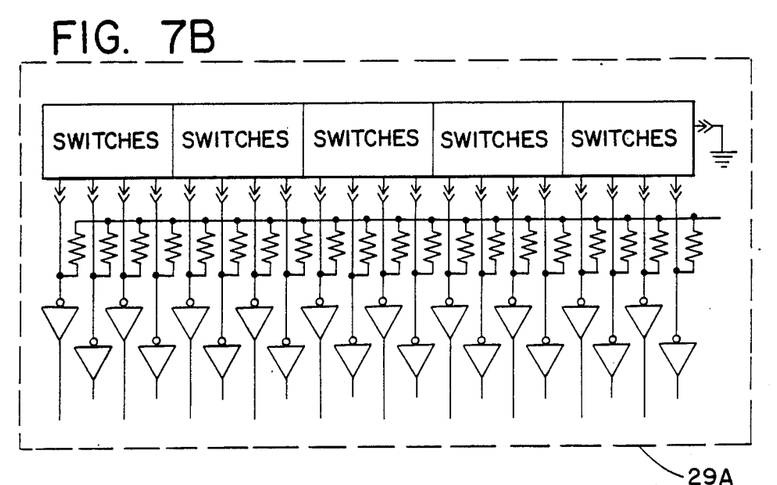
Figure 7C:
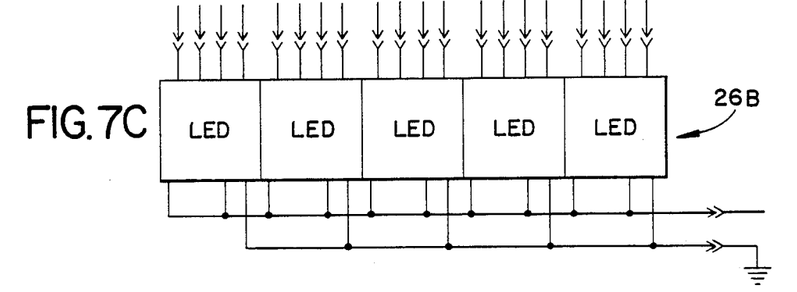
Figure 7D:
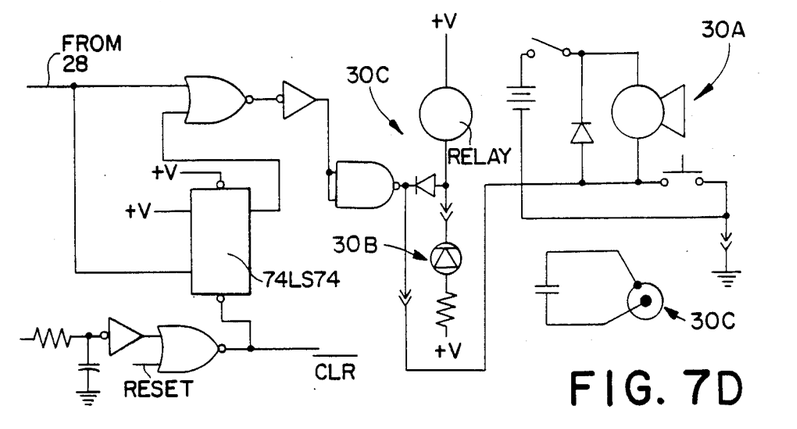
Figure 7E:
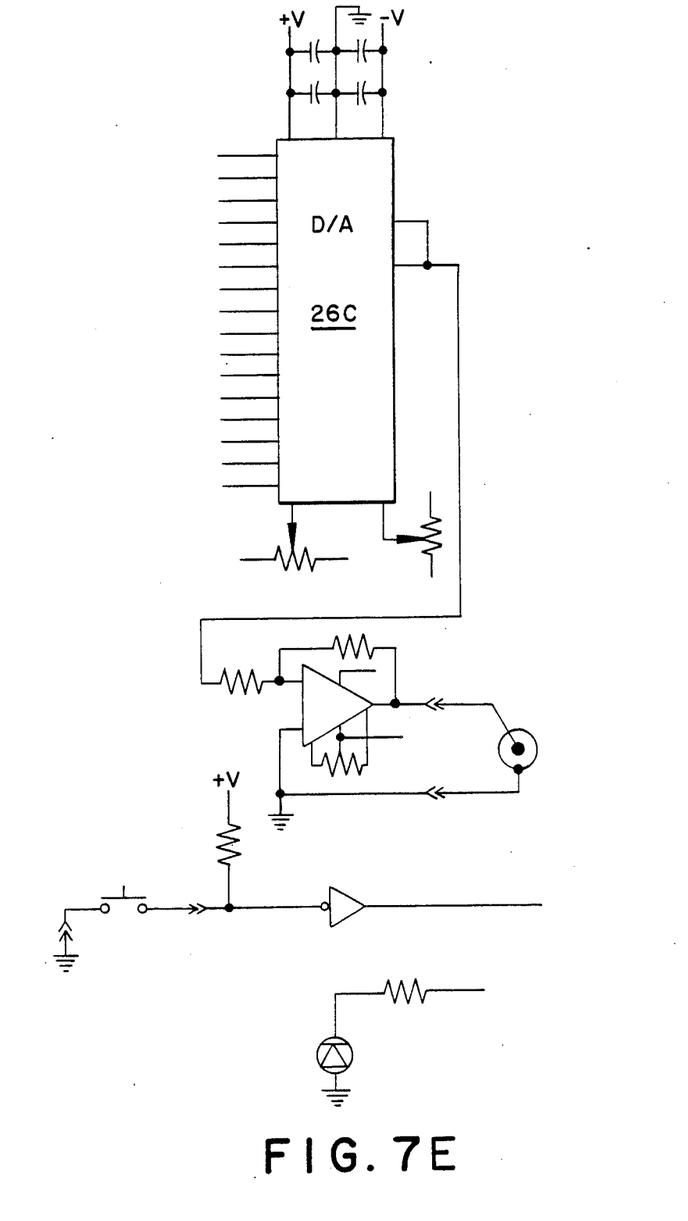
Figure 8:
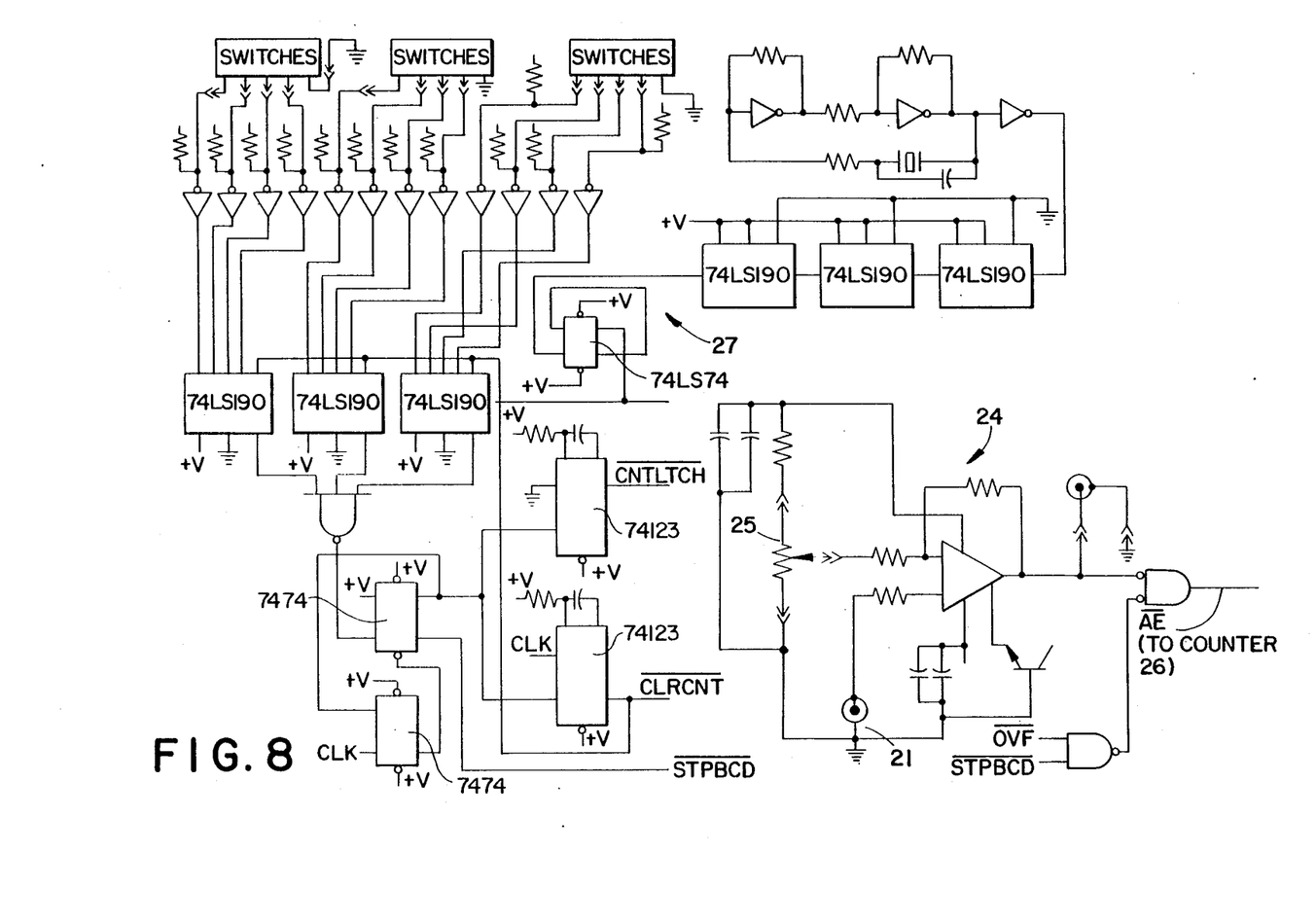
Figure 9:
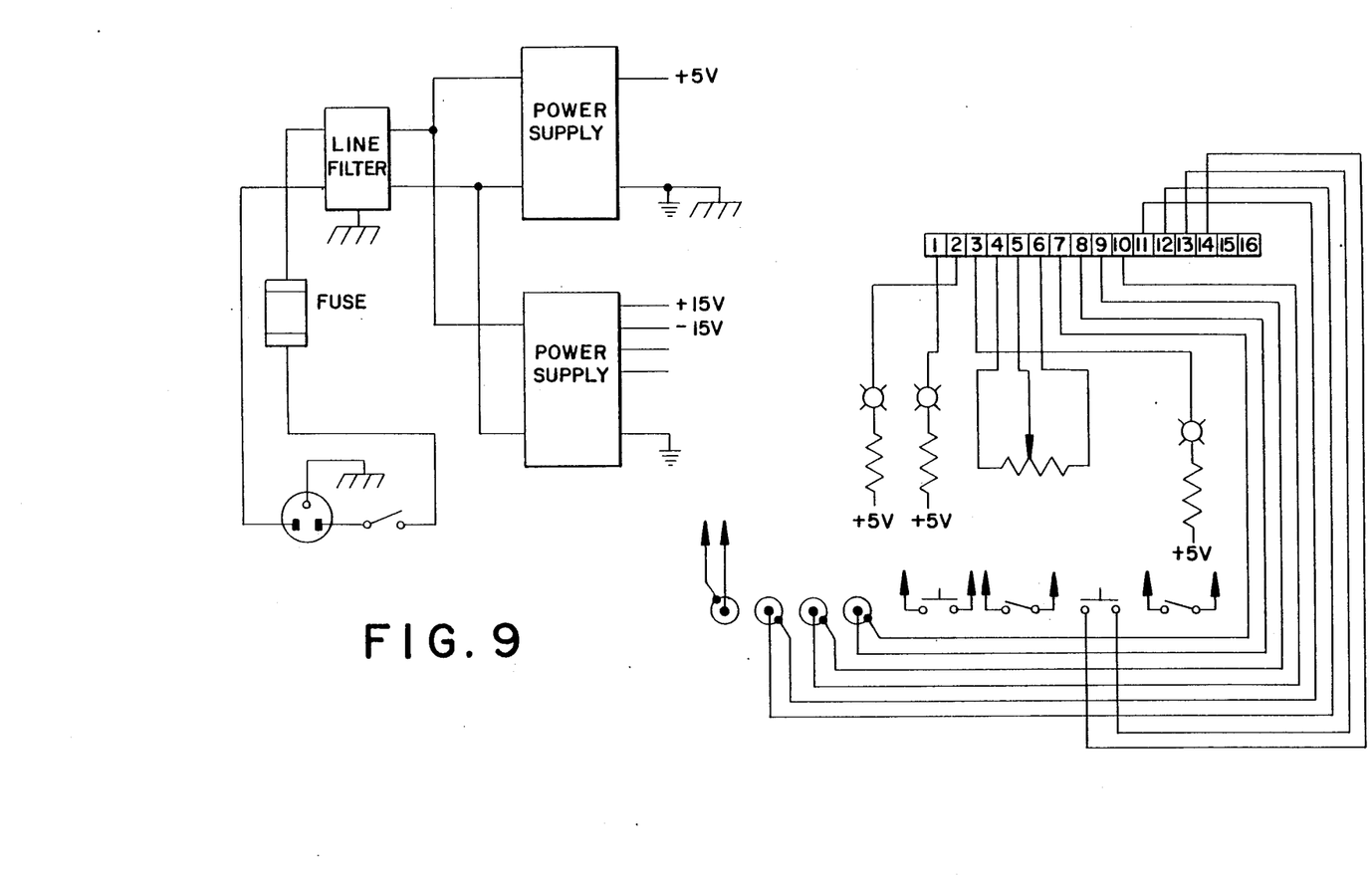

FIG. 6 shows a block diagram of a digital type of acoustic emission count rate processing system, including the acoustic transducer 21, the amplifier 23, the comparator 24, the variable input 25, the counter 26 and the clock 27, as disclosed in FIG. 1. Limit thumbwheels 29A provide a presetable count level to a comparator 28A which compares the count in the counter 26, a BCD counter, via the latch 26A. The comparator 28A optionally includes a 28B timer (such as a commercially available 74121 chip) for dwell (if such is required before a failure is recognized), and has outputs 30 including an audible type (horn) 30A, a visual type (LED) 30B and/or a control type (relay) 30C for automatically affecting machine tool operation. Additionally the latch 26A is coupled to provide a digital display 26B and a digital to analog converter 26C for an analog output of its value. The dwell timer 28B delivers an actuating output signal to the outputs 30 only if the signal output from comparator 28A indicating an unacceptable cutting condition is present for a predetermined time period.

FIGS. 7a–7c, 8 and 9 show detailed electrical wiring diagrams for the block diagram system of FIG. 6, including particularly the counter 26, the latch 26A, the comparator 28A, and the display 26B. The clock 27 and the comparator 24 are also shown, along with a power supply 20A and a switch network 20B.

Figure 10:
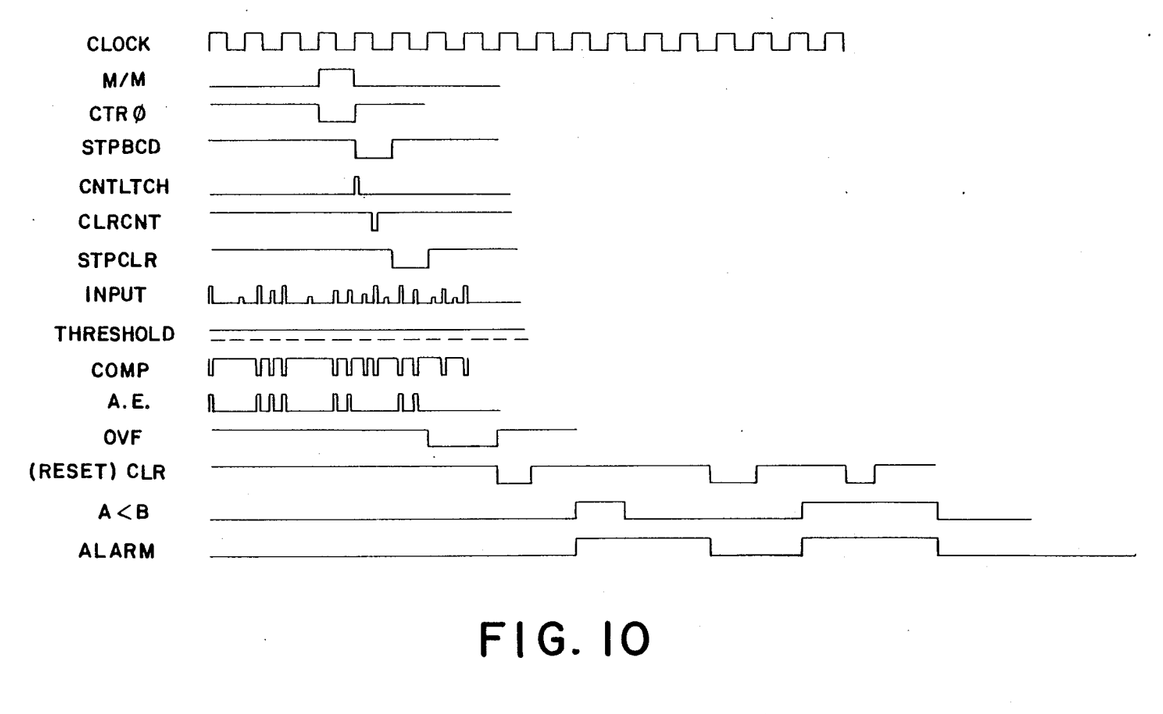
FIG. 10 is a timing diagram of electrical signals from the system shown in FIGS. 6-9.

FIG. 10 shows a timing diagram for the system as described in connection with FIGS. 6–10.

Many modifications and substitutions are possible to the preferred embodiment previously disclosed without departing from the spirit of the present invention. For example, an analog count rate or an average interval between counts monitored in place of the digital count rate discussed in detail above. Also, the cutting rate, cutting tool and the threshold may be varied depending on circumstances. Furthermore, individual features of the present invention may be used without corresponding use of other features disclosed. Accordingly, the foregoing description of the invention should be considered as merely illustrative of the present invention and not in limitation thereof, which is defined solely by the following claims.

Having thus described the invention, what is claimed is:

1. A method of sensing the wear condition of a cutting tool while machining a workpiece, comprising the steps of:
 (A) detecting the acoustic emissions resulting from the machining of the workpiece by the cutting tool;
 (B) generating an electrical signal which varies in magnitude with the detected acoustic emissions;
 (C) comparing the electrical signal with a threshold value;
 (D) producing a pulse each time the electrical signal exceeds said threshold value;
 (E) generating successive timing signals of fixed, equal time duration, each of said timing signals defining a fixed time sample window;
 (F) counting the number of pulses which are produced in step (D) only during each time sample window generated in step (E).
 (G) comparing the number of pulses counted in step (F) during each time sample window with a preset count; and, (H) generating a signal indicative of the wear condition of said cutting tool when the number of pulses counted in step (F) during a single time sample window exceeds said preset count.

2. The method of claim 1, including the step of automatically actuating an alarm only after the signal indicative of the wear condition of said tool exists for a predetermined length of time.

* * * * *